(12) United States Patent
Tokuoka et al.

(10) Patent No.: US 7,261,637 B2
(45) Date of Patent: Aug. 28, 2007

(54) ROTATING SHAFT COUPLING

(75) Inventors: Takamitsu Tokuoka, Yokohama (JP); Izuho Hirano, Yokohama (JP); Yoshiyuki Miyagi, Tokyo (JP); Kaoru Kaneko, Tokyo (JP); Yuichiro Mizuno, Tokyo (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 248 days.

(21) Appl. No.: 10/996,052

(22) Filed: Nov. 24, 2004

(65) Prior Publication Data

US 2005/0119055 A1    Jun. 2, 2005

(30) Foreign Application Priority Data

Nov. 28, 2003  (JP)  ............................. 2003-399450

(51) Int. Cl.
*F16D 3/70* (2006.01)
(52) U.S. Cl. ........................ 464/71; 464/138
(58) Field of Classification Search ................ 464/71, 464/72, 93, 137, 138
See application file for complete search history.

(56) References Cited

U.S. PATENT DOCUMENTS

| 1,658,786 | A | * | 2/1928 | Ellis et al. ................. 464/71 X |
| 3,813,898 | A | * | 6/1974 | Hatch ........................ 464/71 X |
| 6,508,713 | B1 | * | 1/2003 | Kaye ........................... 464/71 |
| 2003/0022720 | A1 | * | 1/2003 | Takei |

FOREIGN PATENT DOCUMENTS

JP   2001-289051   10/2001

* cited by examiner

*Primary Examiner*—Greg Binda
(74) *Attorney, Agent, or Firm*—McDermott Will & Emery LLP

(57) ABSTRACT

Out of combinations of three pins(15) and bushes(16a-16c), a clearance between one of the bushes(16a) and the pin(15) is small, and a clearance between the other two bushes(16b, 16c) and the pins(15) are large, whereby torque transmission is always performed by only one pin(15) and the bush(16a) during rotation to avoid a transfer phenomenon between the pins. Disposing the pins and the bushes at an equal interval allows a good balance of rotation to provide an easy assembly.

7 Claims, 6 Drawing Sheets

ROTATING SHAFT COUPLING

BACKGROUND OF THE INVENTION

1. Field of the Invention

The present invention relates to a rotating shaft coupling that transmits rotation between two shafts arranged as opposed to each other.

2. The Related Art of the Invention

As shown in Japanese Patent Publication No. 2001-289051A, there is known a rotating shaft coupling that transmits rotation between two shafts arranged on a same center line as opposed to each other. A rotating body equipped with a plurality of pins is mounted to one of a drive shaft or a driven shaft and a rotating body equipped with a plurality of bushes engaged with the plurality of the pins is mounted to the other, wherein a rotational torque is transmitted from the drive shaft to the driven shaft through the pins and the bushes engaged with each other.

SUMMARY OF THE INVENTION

An allowance (clearance) is disposed between the pin and the bush in order to compensate for a deviation between each shaft center of the two shafts. Therefore, in the event that there exists the deviation with regard to each shaft center of the two shafts, there occurs a transfer phenomenon that a location where the pin and the bush are contacted to carry out torque transmission between the two shafts in turn transfers with rotation of the two shafts.

This phenomenon will be explained with reference to FIG. 1.

FIG. 1 shows a coupling mechanism which comprises a first rotating body P provided with three pins (A), (B), and (C) spaced at an angle of 120° and a second rotating body Q provided with three bushes (a), (b), and (c) at three locations corresponding to the three pins, wherein rotation is transmitted between the first rotating body P and the second rotating body Q.

A spatial clearance or a circular allowance formed of an elastic body as a bush is arranged between each pin (A)-(C) and each bush (a)-(c). Each clearance is formed uniformly. In the case of transmitting rotation from the first rotating body P to the second rotating body Q, when one shaft center exactly corresponds to the other, the respective pins (A)-(C) equally contact the inner surfaces of the corresponding bushes (a)-(c), so that the torque transmission is carried out at the three locations.

In contrast, in the event that, as shown in FIG. 1, the two shafts are not co-axial by an eccentricity amount $\Delta 1$, the torque transmission is carried out at two locations of the pin (B) and the pin (C) as shown in FIG. 1 (1). The pin (A) is not contacted with the bush (a), to produce a free state where the torque is not transmitted between the two shafts. FIG. 1-(2) shows the state when the shafts have rotated in the counter-clockwise direction by 90° from the state in FIG. 1-(1). Then the pin (A) contacts the bush a to start the torque transmission together with the pin (B) where a clearance occurs between the pin (C) and the bush (c). At a state in FIG. 1-(3) when the shafts further rotate by 90° from the state in FIG. 1-(2), the torque transmission is carried out only by the pin (A) and at a state in FIG. 1-(4) when the shafts further rotate by 90° from the state in FIG. 1-(3), the torque transmission is carried out by the pin (A) and the pin (C). While the shafts thus rotate by one rotation, a contact portion between the plurality of the pins and the corresponding bushes transfers from one to the other in turn. This transfer phenomenon causes occurrence of vibrations during rotation transmission between the two shafts arranged as opposed to each other. This problem is noticeable in case where an instrument to generate torque fluctuations, such as a compressor is disposed to a driven side to which the rotation is transmitted. When the compressor is driven through the rotating shaft coupling, the torque fluctuations of the compressor and the vibrations of the coupling resonate to possibly generate larger vibrations and noises.

In view of the above, there exists a need for a rotating shaft coupling which overcomes the above-mentioned problems in the related art. The present invention addresses this need in the related art as well as other needs, which will become apparent to those skilled in the art from this disclosure.

It is an object of the present invention to provide a rotating shaft coupling, which can restrict generation of vibrations and noises.

According to one aspect of the present invention, a rotating shaft coupling which connects a first shaft and a second shaft arranged co-axially with each other,comprises, a first rotating body disposed to one of the first and second shaft, a second rotating body disposed to the other, as opposed to the first rotating body, a plurality of pins spaced by an interval of an equal angle on a circumference of the first rotating body at a predetermined radius away from a shaft center thereof. The pins extend in a shaft direction and have the same diameter with each other. A plurality of engagement section are arranged at location in the second rotating body correaponding to the pins to receive the pins. A first allowance is arranged between an inner diameter of one of the engagement section and a pin engaged with the one. The first allowance corresponds to a deviation amount assumed between a shaft center of the first shaft and a shaft center of second shaft, and a second allowance is arranged between an inner diameter of the other of the engagement sections and the pin engaged with the other. The second allowance is larger than the first allowance.

These and other objects, features, aspects and advantages of the present invention will be become apparent to those skilled in the art from the following detailed description, which, taken in conjunction with the annexed drawings, discloses preferred embodiments of the present invention.

BRIEF EXPLANATION OF THE DRAWINGS

Referring now to the attached drawings which form a part of this original disclosure.

DETAILED DESCRIPTION OF THE PREFERRED EMBODIMENTS

Figure 1:
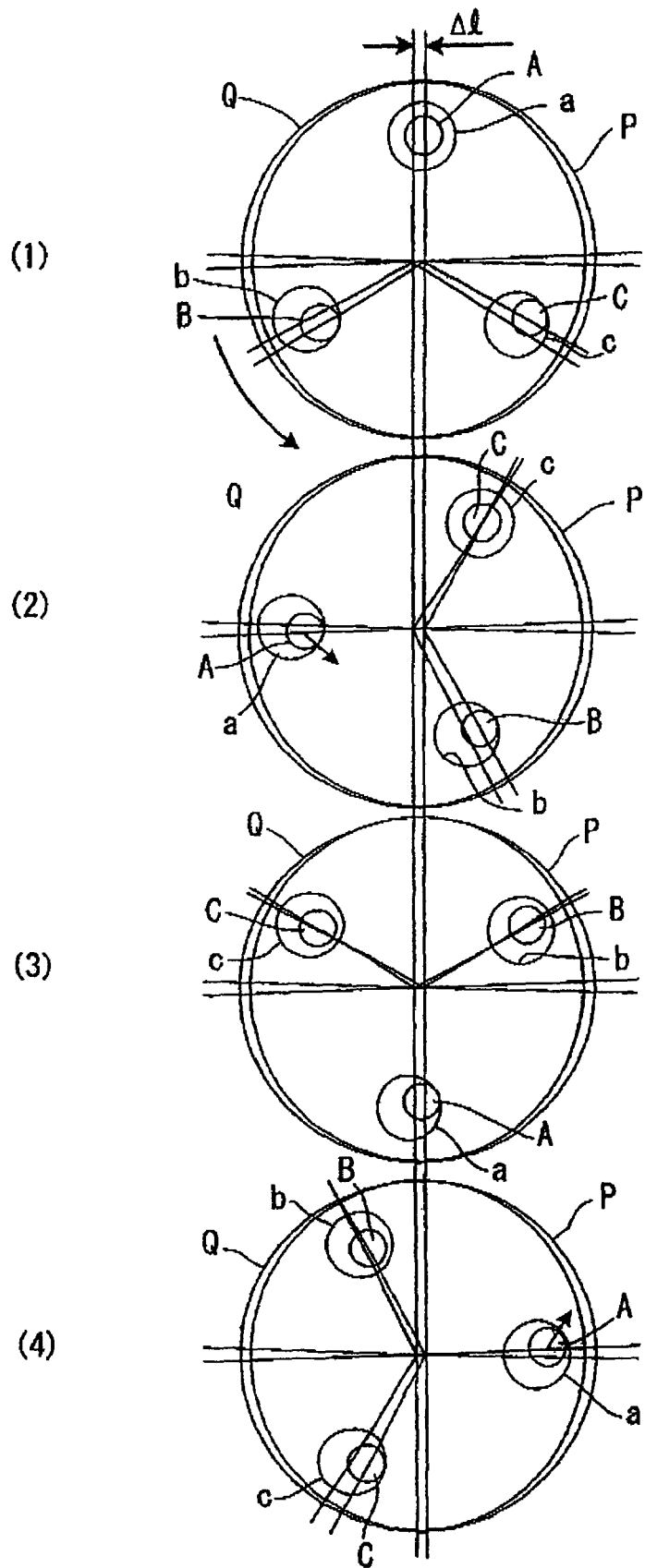
FIG. 1 is an explanatory view showing a transfer phenomenon with regard to torque transmission portions.
Figure 2:
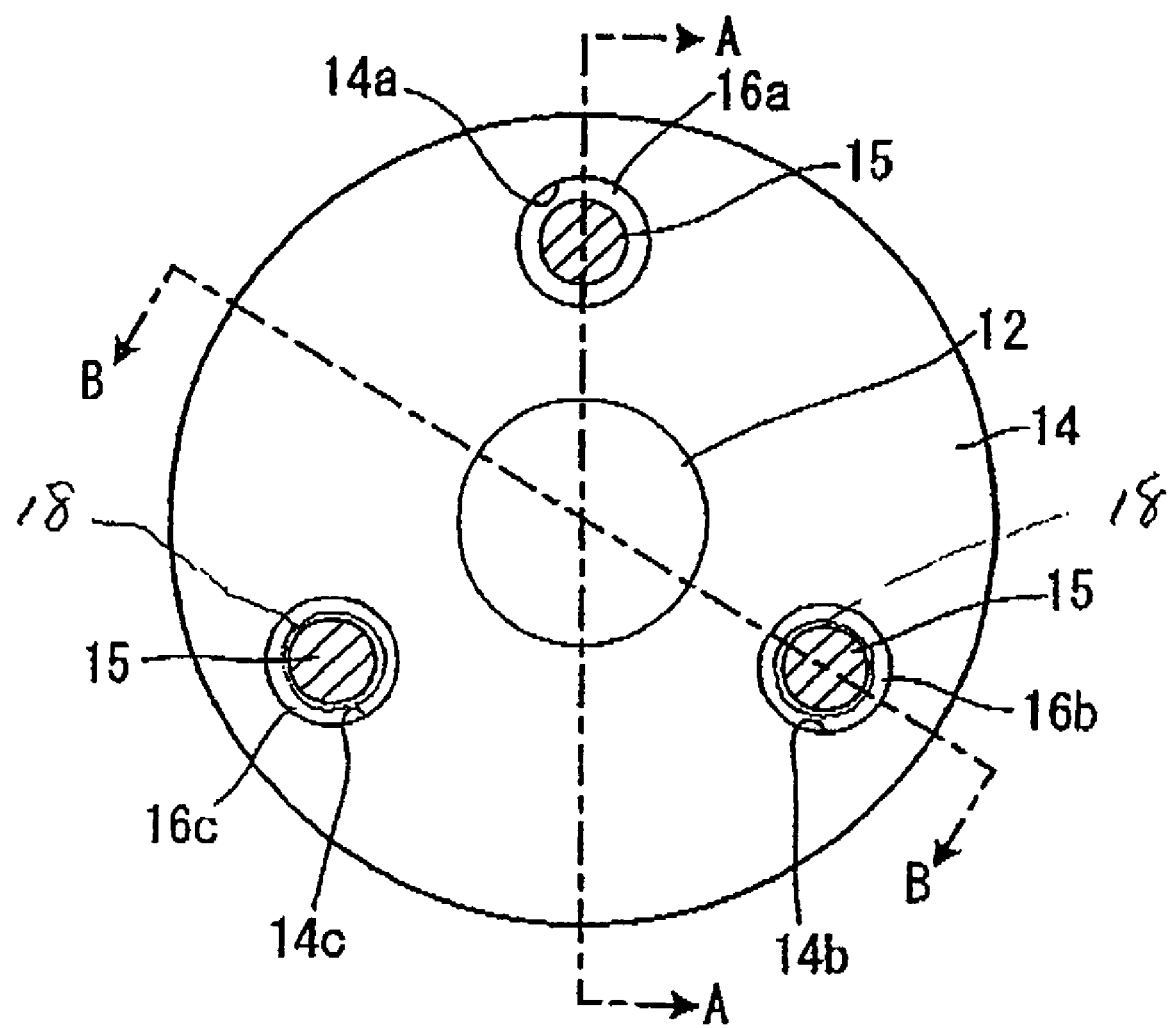
FIG. 2 is a front view showing a first preferred embodiment according to the present invention.

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

FIG. 1-FIG. 4 show a first preferred embodiment. A drive shaft 11 and a driven shaft 12 are arranged as opposed to each other so that shaft centers of the drive shaft 11 and the driven shaft 12 are on a co-axial line. Disc-shaped rotating bodies 13, 14 are disposed as opposed to each other to a shaft end of each of the drive shaft 11 and the driven shaft 12. The drive rotating body 13 is provided at an end surface with three pins 15 inserted therein and spaced by an equal interval of 120° on the same circumference at a predetermined radius away from a shaft center of the rotating body 13 where the pins is placed in a shaft direction of the drive shaft 11, as well as placed as opposed to the rotating body 14.

The driven rotating body 14 is provided at an end surface with bores 14a, 14b, and 14c formed at three locations corresponding to the three pins 15. Namely a center of each bore 14a-14c is on the same circumference with the pins 15 and is placed by an interval of 120°.

An inner diameter of each bore 14a-14c is the same with each other and is larger than an outer diameter of each pin 15. A first bush 16a is inserted in one bore 14a of the three bores 14a-14c and the other two, namely the second and third bushes 16b, 16c are inserted respectively in the other two bores 14b, 14c.

Each bush 16a-16c is formed in a cylindrical shape having a through hole in a center thereof and made of a flexible plastic material having lubricating property and cushioning property.

Figure 3:
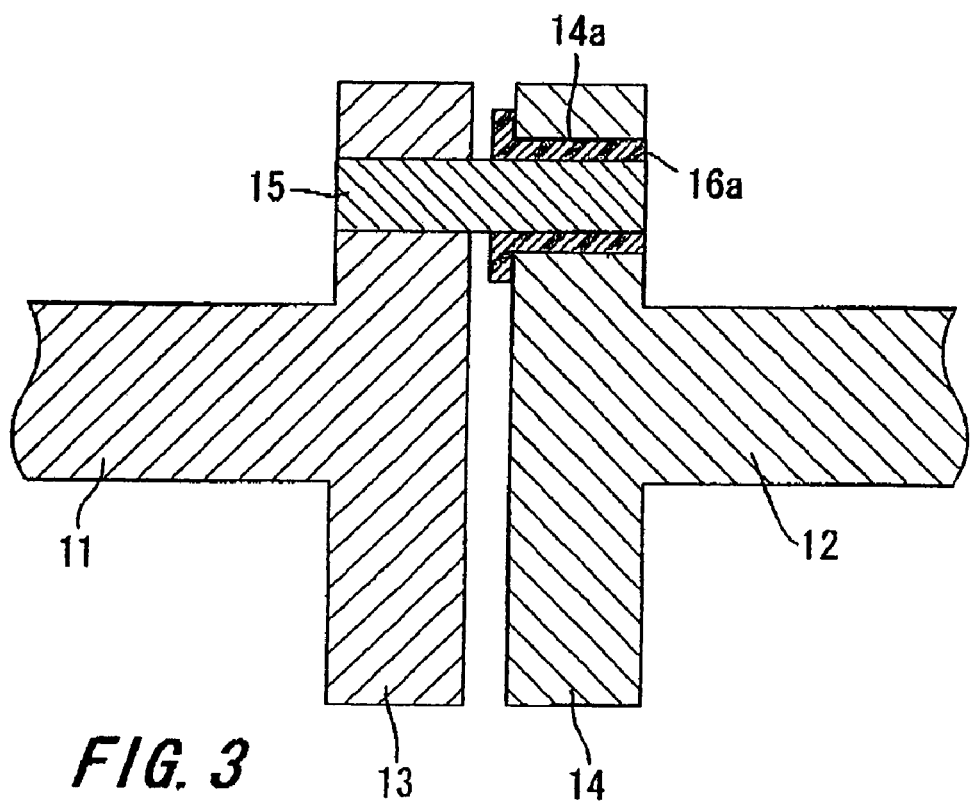
FIG. 3 is a cross sectional view taken on lines A-A in FIG. 2.

As shown in FIG. 3, the first bush 16a is press fitted in the bore 14a, but has such an allowance to the pin 15 as to be rotatable relative to the pin 15. In this case a deviation between a shaft center of the drive shaft 11 and a shaft center of the driven shaft 12, namely the eccentricity of the two shafts is compensated by an allowance of the elastic deformation of the bush 16a. Accordingly the allowance is usually set based upon the maximum eccentricity amount assumed between the drive shaft 11 and the driven shaft 12.

Figure 4:
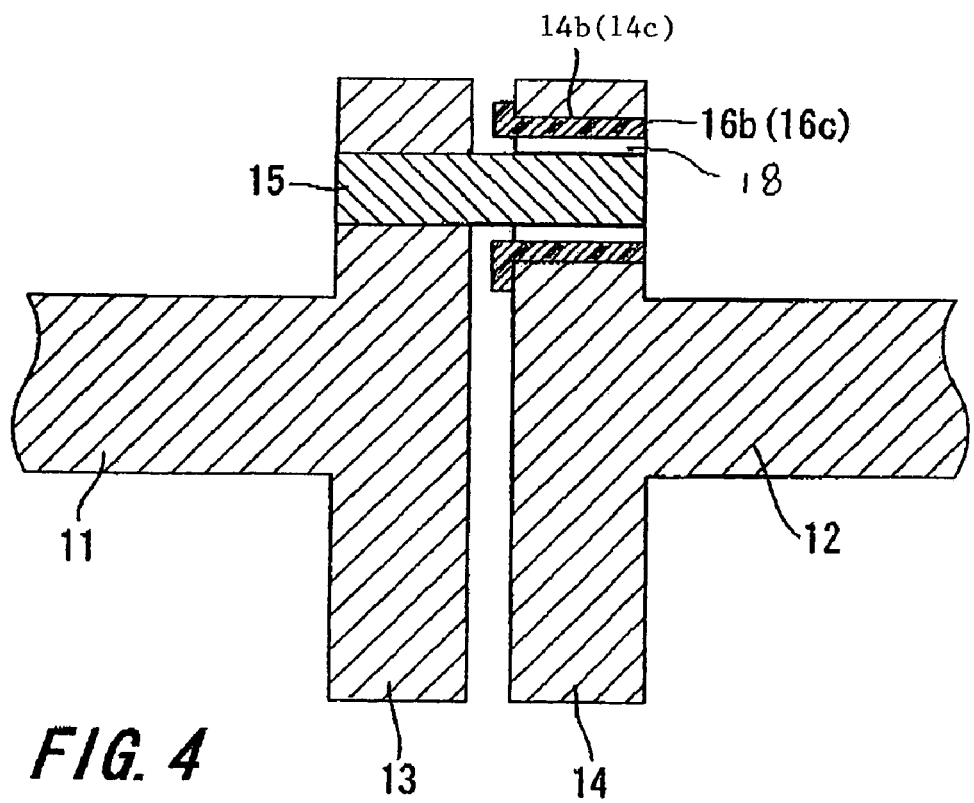
FIG. 4 is a cross sectional view taken on lines B-B in FIG. 2.

The other two, the second and the third bushes 16b, 16c are press fitted to the bores 14b, 14c. However, as shown in FIG. 4, an inner diameter of each bush 16b, 16c is larger than an outer diameter of the pin 15 and an allowance is disposed as a circular clearance 18 between an inner surface of each bush and an outer surface of the pin 15. Namely the second bush 16b and the third bush 16c have the same inner diameter with each other and the inner diameter thereof is larger than that of the first bush 16a.

Figure 5:
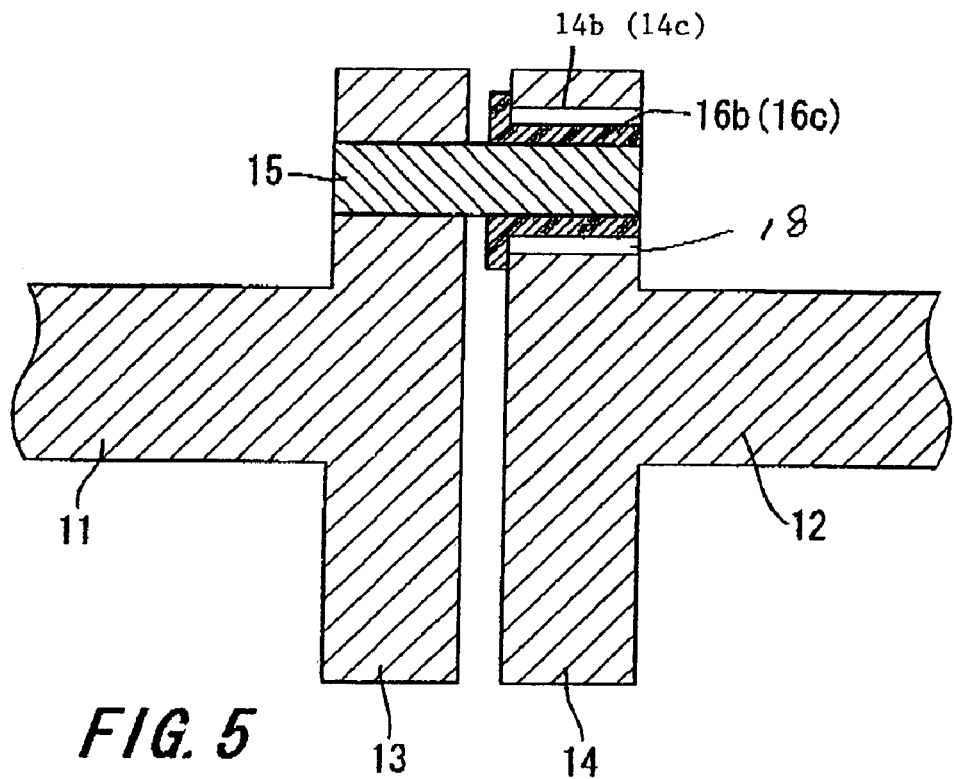
FIG. 5 is a cross sectional view showing a second preferred embodiment according to the present invention, corresponding to FIG. 4.

However, in FIG. 5 which is a second preferred embodiment, an inner diameter of each bush 16b, 16c has the same with that of the bush 16a and is fitted in the pin 15 without any clearance, but an outer diameter thereof may be formed smaller to provide a clearance between the each bush 16b, 16c and an inner surface of each bore 14b, 14c.

Namely a first engagement section equipped with the first bush 16a to receive the pin 15 has an allowance to compensate for the deviation between the shaft center of the drive shaft 11 and the shaft center of the driven shaft 12 and on the other hand, the second and the third engagement section equipped with the second and the third bush 16b, 16c have a second allowance to the pin 15, the second allowance being larger than the first allowance.

As constructed above, when the rotation is transmitted from the drive shaft 11 and the driven shaft 12, a larger clearance, namely a larger allowance exists between the bushes 16b, 16c and the pin 15 than between the bush 16a and the pin 15 out of the combinations of the pins 15 at the three locations and the bushes 16a-16c. Accordingly, whether or not the deviation between the shaft center of the drive shaft 11 and the shaft center of the driven shaft 12 exists, torque of the drive shaft 11 is always transmitted by only the pin 15 engaged with the bush 16a out of the three pins 15.

Even if the bush 16a gets in contact with the pin 15, a non-contact condition is maintained between the other two bushes 16b, 16c and the pins 15 or the bores 14b, 14c, and the rotational torque is transmitted exclusively by one pin 15 from the drive shaft 11 to the driven shaft 12.

Therefore, the phenomenon that one pin to perform the torque transmission transfers to the other in turn during transmitting the rotational torque as the conventional art disappears, to avoid generation of vibrations due to what is called a transfer phenomenon.

The three pins 15 and the three bushes 16a-16c are disposed on the same circumference by an interval of an equal angle respectively to the rotating body 13 and the rotating body 14 and accordingly the rotating balance is maintained to be better, as compared to disposition of one pin and one bush. And just in case one pin 15 to perform the torque transmission is damaged, the other two pins 15 can perform the torque transmission, to ensure a failsafe function. And since any combination at three locations between the three pins 15 and three bushes 16a-16c can be made, a specific positioning of the pins and the bushes is not required on assembly, to provide an easy assembly.

Figure 6:
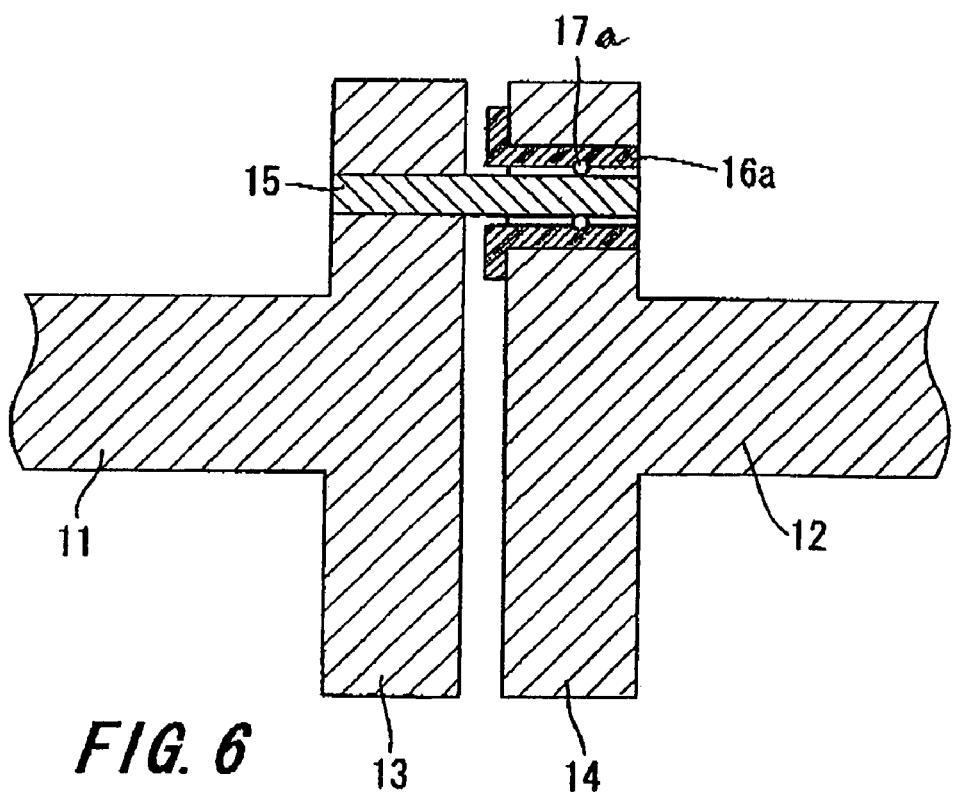
FIG. 6 is a longitudinal sectional view showing a third preferred embodiment according to the present invention.
Figure 7:
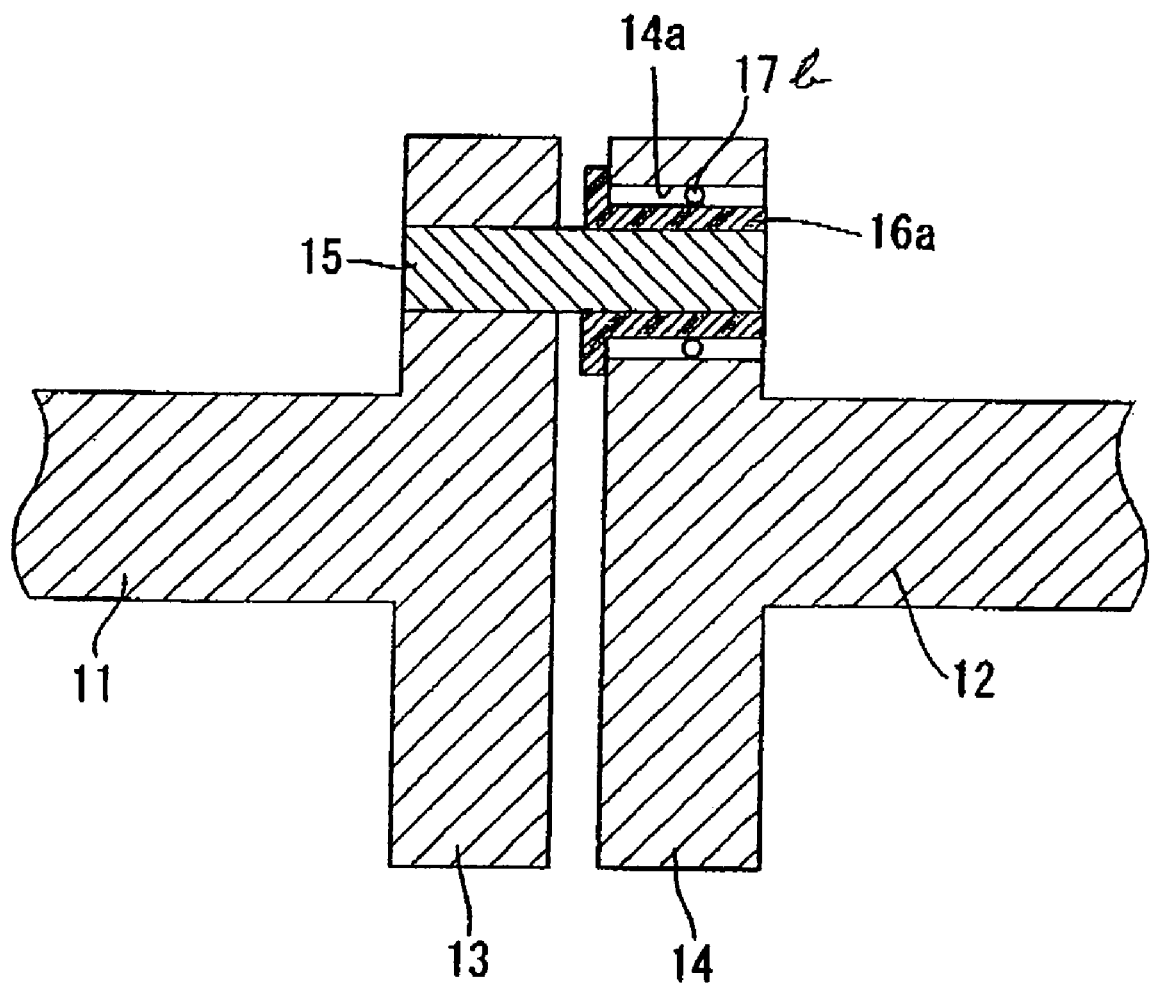
FIG. 7 is a longitudinal sectional view showing a fourth preferred embodiment according to the present invention.

FIG. 6 and FIG. 7 show other preferred embodiments of the present invention.

FIG. 6 is a longitudinal cross sectional view showing a third preferred embodiment of the present invention where a circular clearance is formed between the inner surface of the first bush 16a and the outer surface of the pin 15 and an O-ring made of an elastic body such as a rubber is interposed in the circular clearance.

And FIG. 7 is a longitudinal cross sectional view showing a fourth preferred embodiment of the present invention where a circular clearance is formed between the outer surface of the first bush 16a and the inner surface of the bore 14a, and an O-ring 17b made of an elastic body such as a rubber is interposed in the circular clearance.

According to the third and fourth preferred embodiments, a relative displacement in a radius direction is ensured to be larger, thereby to compensate, by the O-ring 17a or 17b, for deformation of the bush 16a or the pin 15 due to a temperature change or the like. And the eccentricity between the drive shaft 11 and the driven shaft 12 can be compensated only by the O-ring 17a or 17b. As a result in these cases, a material having a small deformation amount, for example a hard resin or a metal can be used as the bush 16a.

Figure 8:
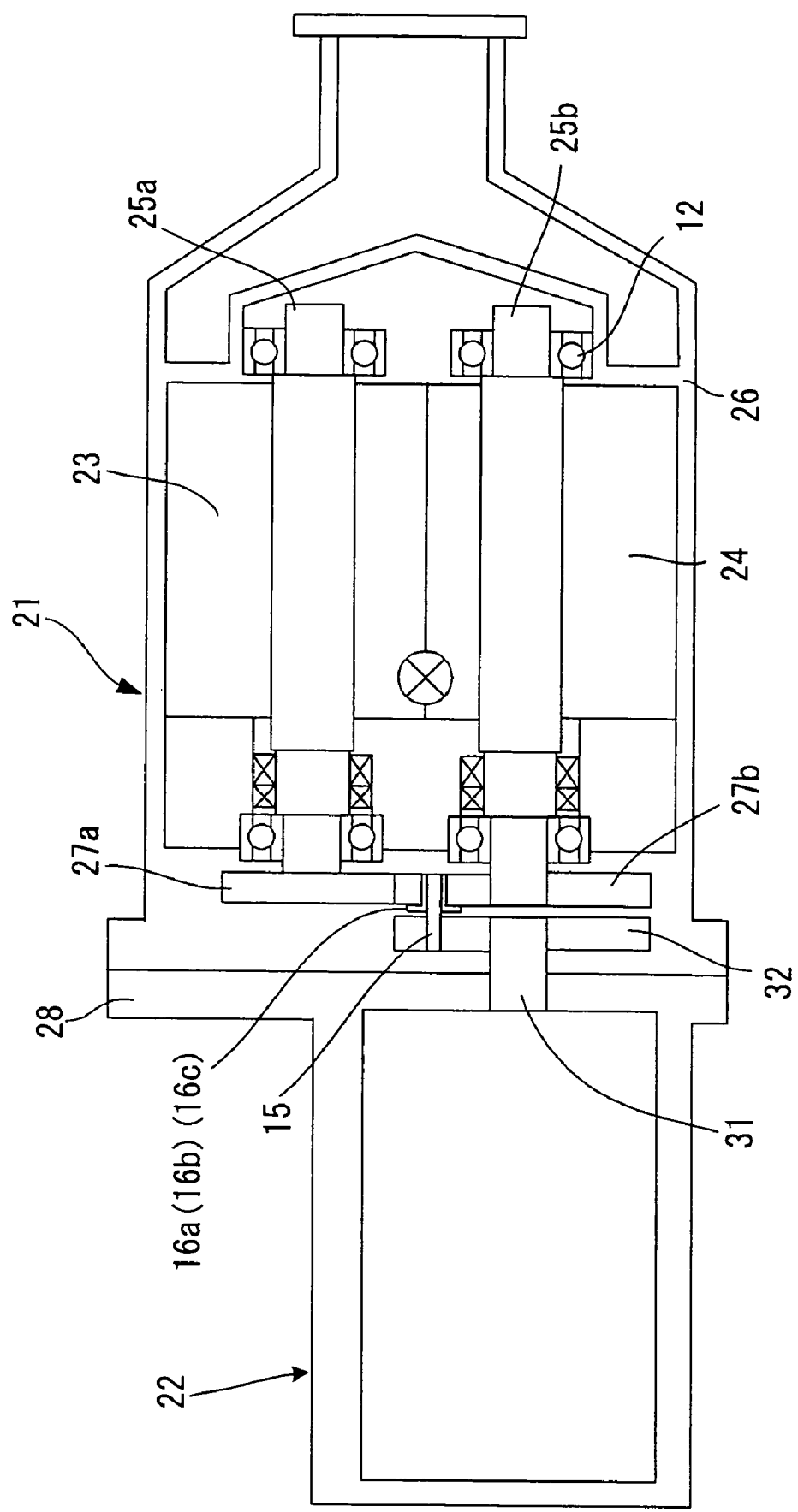
FIG. 8 is a longitudinal sectional view showing a schematic construction in a fifth preferred embodiment according to the present invention.

FIG. 8 is a fifth preferred embodiment of a compressor-driving apparatus to which a rotating shaft coupling of the present invention is applied. Components structurally identical to those in FIGS. 2-5 are referred to as identical numerals. In FIG. 8, there are provided an air compressor 21 and an electric motor 22 to drive the compressor 21. The compressor 21 is provided with two rotors 23, 24 located in parallel. The rotor 23 is a male rotor having spiral crown sections on a periphery thereof, and the rotor 24 is a female rotor having spiral root sections corresponding to the crown sections of the male rotor 23.

The rotor 23 and the rotor 24 are rotatably supported respectively through a rotor shaft 25a and a rotor shaft 25b in a housing 26 to be engaged through a slight clearance with each other. In order to synchronously rotate the rotors 23, 24 in opposing directions with each other, a gear 27a and a gear 27b to be mutually engaged are mounted to the shaft 25a and the shaft 25b.

The electric motor 22 is received in a casing 28. And a disc-shaped rotating plate 32 is mounted to an end of a motor shaft 31 of the electric motor 22. The housing 26 and the housing 28 are fastened by bolts or the like (not shown) so that the rotor shaft 25b and the motor shaft 31 are positioned to be co-axial with each other.

A plurality of pins 15 are disposed and inserted in a shaft direction in a rotating plate 32 disposed in an end of the motor shaft 31, and are placed as opposed to the gear 27b. On the other hand, plastic bushes 16a-16c engaged with the pins 15 are disposed at locations to the gear. 27b corresponding to the pins 15. Under the housing 26 and the housing 28 coupled, the pins 15 are engaged with the bushes 16a-16c, to transmit a rotational force of the drive shaft 11 to the rotor shaft 25b and to rotate the compressor 21.

In a relation with the rotating shaft couplings shown in FIGS. 2-7, the motor shaft 31, the motor shaft 25b, the rotating plate 32, and the gear 27b correspond respectively to the drive shaft 11, the driven shaft 12, the drive rotating body 13, and the driven rotating body 14, which constitutes the rotating shaft coupling in the same as the other preferred embodiments to perform the rotation transmission only at one location out of the combinations between the plurality of the pins 15 and the bushes 16a-16c.

Namely only the first bush 16a and the pin 15 transmit the rotational torque between the shafts. Thereby, when the electric motor 22 rotates the compressor 21, the rotating shaft coupling prevents occurrence of vibrations or resonance, and noises due to the transfer phenomenon of the pins 15 in the rotating shaft coupling, and as a result, a quiet driving by the electric motor 22 can be performed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents. The contents of Japanese Patent Application No. 2003-399450 (filed 28 Oct. 2004) is incorporated herein by reference.

What is claimed is:

1. A rotating shaft coupling which connects a first shaft and a second shaft arranged co-axially with each other, comprises:

a first rotating body disposed to one of the first and the second shaft;

a second rotating body disposed to the other, as opposed to the first rotating body;

a plurality of pins spaced by an interval of an equal angle on a circumference of the first rotating body at a predetermined radius away from a shaft center thereof, the pins extending in a shaft direction and having the same diameter with each other; and a plurality of engagement sections at locations in the second rotating body corresponding to the pins to receive the pins, wherein:

a first allowance is arranged between an inner surface of one of the engagement sections and a pin engaged with the one, the first allowance corresponding to a deviation amount assumed in design between a shaft center of the first shaft and a shaft center of the second shaft, a second allowance is arranged between an inner surface of the other of the engagement sections and the pin engaged with the other, the second allowance being larger than the first allowance, and a rotation torque between the first and second shaft is transmitted through one of the pins and the corresponding engagement section having the first allowance.

2. The rotating shaft coupling according to claim 1, wherein: the engagement section having the first allowance includes a cylindrical bush permitting the first allowance and having cushioning function.

3. The rotating shaft coupling according to claim 2, wherein: the bush is inserted into a bore formed in the second rotating body, and a O-ring made of an elastic body is interposed in a circular clearance formed between the bush and the pin.

4. The rotating shaft coupling according to claim 2, wherein: the bush is inserted into a bore formed in the second rotating body, and a O-ring made of an elastic body is interposed in a circular clearance formed between the bush and an inner surface of the bore.

5. The rotating shaft coupling according to claim 2, wherein: the bush is made of a plastic material.

6. The rotating shaft coupling according to claim 2, wherein: each pin and each corresponding bush are disposed at three locations by an interval of 120° respectively in the first shaft and the second shaft, and are placed on the same circumference from each shaft center of the first shaft and the second shaft.

7. The rotating shaft coupling according to claim 1, wherein: the first shaft includes a motor shaft of an electric motor, and the second shaft includes an input rotor shaft of a compressor.

* * * * *